(12) United States Patent
Kennedy et al.

(10) Patent No.: US 11,930,965 B2
(45) Date of Patent: Mar. 19, 2024

(54) VACUUM BLENDER

(71) Applicant: Sunbeam Products, Inc., Boca Raton, FL (US)

(72) Inventors: William Kennedy, Boca Raton, FL (US); Anthony M. DeLeo, Portage, MI (US)

(73) Assignee: Sunbeam Products, Inc., Atlanta, GA (US)

( * ) Notice: Subject to any disclaimer, the term of this patent is extended or adjusted under 35 U.S.C. 154(b) by 223 days.

(21) Appl. No.: 17/297,539

(22) PCT Filed: Dec. 12, 2019

(86) PCT No.: PCT/US2019/065935
§ 371 (c)(1),
(2) Date: May 27, 2021

(87) PCT Pub. No.: WO2020/123782
PCT Pub. Date: Jun. 18, 2020

(65) Prior Publication Data
US 2021/0393081 A1   Dec. 23, 2021

Related U.S. Application Data

(60) Provisional application No. 62/778,844, filed on Dec. 12, 2018.

(51) Int. Cl.
*A47J 43/07* (2006.01)
*A47J 43/046* (2006.01)
*A47J 43/08* (2006.01)

(52) U.S. Cl.
CPC ......... *A47J 43/0716* (2013.01); *A47J 43/046* (2013.01); *A47J 43/085* (2013.01)

(58) Field of Classification Search
CPC .... A47J 43/046; A47J 43/0716; A47J 43/085; B01F 33/70
See application file for complete search history.

(56) References Cited

U.S. PATENT DOCUMENTS

| 9,999,319 B2 | 6/2018 | Kim | |
| 10,750,907 B2 * | 8/2020 | Kim | ........................ B02C 18/16 |

(Continued)

FOREIGN PATENT DOCUMENTS

| CN | 107411589 A | * | 12/2017 | ............. A47J 43/046 |
| CN | 107468099 A | * | 12/2017 | ............. A47J 43/046 |

(Continued)

OTHER PUBLICATIONS

English translation of KR101851526B1, Kim, obtained from https://worldwide.espacenet.com on Apr. 1, 2023 (Year: 2023).*

*Primary Examiner* — Marc C Howell
*Assistant Examiner* — Patrick M McCarty
(74) *Attorney, Agent, or Firm* — Husch Blackwell LLP

(57) ABSTRACT

A vacuum blender including a base assembly having a blender motor and a vacuum motor, a vertical arm member for engaging both a blender jar assembly and a storage jar assembly, and vacuum technology associated with the base assembly, the vertical arm assembly, and the lid member associated with both the blender jar assembly and the storage jar assembly for removing oxygen from within either the blending jar prior to the start of a blending operation, or a storage/to-go jar wherein a finished blended food item can be stored in the storage jar and oxygen can be removed from within the storage jar for better food preservation before the storage jar is stored in a freezer, refrigerator or other storage locations. The storage jar further includes a drinking spout wherein the contents in the storage jar can be easily accessed for drinking when removed from storage.

15 Claims, 9 Drawing Sheets

(56) References Cited

U.S. PATENT DOCUMENTS

| | | | |
|---|---|---|---|
| 10,905,286 B2 * | 2/2021 | Cuaresma, Jr. | A47J 43/0727 |
| 2011/0220674 A1 * | 9/2011 | Honeyghan | A47G 19/22 |
| | | | 220/849 |
| 2014/0137750 A1 | 5/2014 | Arai et al. | |
| 2014/0299687 A1 * | 10/2014 | Rosenzweig | A47J 43/085 |
| | | | 366/244 |
| 2017/0086622 A1 * | 3/2017 | Chung | A47J 43/0716 |
| 2018/0326378 A1 * | 11/2018 | Moon | B01F 33/70 |
| 2019/0112112 A1 * | 4/2019 | Choltco-Devlin | B65D 47/265 |
| 2019/0274481 A1 * | 9/2019 | Han | A47J 43/07 |

FOREIGN PATENT DOCUMENTS

| | | | | |
|---|---|---|---|---|
| CN | 108324142 A | * | 7/2018 | A47J 43/046 |
| KR | 101673246 B1 | | 11/2016 | |
| KR | 1020170070870 A | | 6/2017 | |
| KR | 101851526 B1 | | 6/2018 | |
| WO | WO-2018107451 A1 | * | 6/2018 | |

* cited by examiner

VACUUM BLENDER

CROSS REFERENCE TO RELATED APPLICATION

This application claims priority to International Patent Application No. PCT/US2019/065935, filed 12 Dec. 2019, which claims priority to U.S. Provisional Patent Application No. 62/778,844, filed 12 Dec. 2018, the entirety of both of which are incorporated by reference.

BACKGROUND OF THE INVENTION

The present invention relates generally to blenders and, more particularly, to a blender with vacuum technology that removes oxygen from within the blending jar prior to the start of the blending process.

When fruits, vegetables and other food items are processed in a blender, the internal fibers within the particular food product begin to change after contact with oxygen. By removing oxygen from a particular blender jar before beginning the blending process, more of the nutrients associated with the particular food product in the jar such as fruits and vegetables will be preserved. It is therefore desirable to provide a blender with vacuum technology so that air/oxygen can be removed from the blender jar before a particular blending operation begins.

In addition, storing food, vegetables, herbs, preparation ingredients and other food items is also common practice. Often times these products are stored in ordinary food storage bags or containers which utilize an interlocking seal or zipper closure and then the storage bags are placed in freezers, refrigerators, pantries and other storage locations for use later. Over short periods of time, food stored in ordinary food storage bags will spoil, waste or become unusable and will have to be thrown away. It is therefore also desirable to provide a blender with vacuum technology and a storage/to-go jar with a drinking spout wherein a drinkable food product such as a finished blended food item like a smoothie can be stored in the storage jar and the vacuum blender can thereafter remove the air/oxygen from within the storage jar for better food preservation before the storage jar is stored in a freezer, refrigerator or other storage location. The inclusion of a storage jar with a drinking spout would be highly beneficial for people on the go.

SUMMARY OF THE INVENTION

The present invention relates to a blender having vacuum technology that removes oxygen from within either a blending jar prior to the start of the blending operation, or a storage/to-go jar wherein a finish blended food item has been stored in the storage jar and the present vacuum blender can then remove the air/oxygen from within the storage jar before the storage jar is stored in a freezer, refrigerator or other storage location.

In one embodiment of the present invention, the present blender includes a base member having a blending motor and a vacuum motor for pulling a vacuum as will be hereinafter further explained. The base member likewise includes a vertical tower or arm member which houses componentry that allows air to travel from the blending jar through the vertical tower or arm to the vacuum motor. The vertical tower includes a locking tab which is positioned and located so as to be received by an opening or scoop associated with the lid portion of a blending jar or a storage/to-go jar so as to hold and lock the jars in a proper position as will be hereinafter further explained. The vertical tower or vertical arm likewise includes a vacuum port which engages a complimentary vacuum port associated with the lid portion of the jars. The upper portion of the vertical tower or arm is movable in a vertical direction and is positioned in a raised position for receiving the jars onto the base member. In this regard, the jars are positioned on the base member and then rotated approximately through 45° of rotation so as to lock the jars onto the base member. This positions the scoop or opening associated with the jar lids as well as the vacuum port associated with the jar lids in proper position for receiving the locking tab and vacuum port associated with the vertical arm of the present unit. When the upper portion of the vertical arm is moved in a downward direction, the locking tab will engage the scoop or opening associated with the jar lids and the vacuum port associated with the vertical arm will be moved horizontally through the use of a wedge member as will be hereinafter further explained so that the vacuum port associated with the vertical arm will mate with the vacuum port associated with the jar lids.

When the blender jar is positioned and locked onto the base member, a micro switch located on the base member is engaged, the micro switch allowing the blender motor to be activated for the blending process. In similar fashion, when the vertical tower is moved downwardly and engages the blending jar lid, a second micro switch located in the vertical tower is likewise engaged thereby allowing the vacuum motor to be activated. This micro switch may detect the presence of the lid, or the position of the tower, or the like. As a result, in order to both pull a vacuum on the blending jar and thereafter blend the food product stored within the blending jar, both micro switches must be activated before these operations can occur. If the lid is not present, the blender will not operate.

The connection between the vertical arm and the lids associated with the blending jar and the storage/to-go jar can be released by pushing a release button associated with the top portion of the vertical arm. The release button reverses the operation previously explained and releases the locking tab from the scoop or opening associated with the jar lids; it releases the vacuum port associated with the vertical arm and allows the vacuum port to retract from the vacuum port associated with the jar lids; and it disengages the second micro switch. Pushing the release button also breaks the vacuum connection to the vacuum motor via a plug inside the vertical arm.

A network of parts channels the airflow to the center of the jar lids through the vertical arm in a tortuous path thereby minimizing the possibility of food entering into the vacuum motor. In this regard, the jar lids likewise include a screen to minimize food particles and other debris from entering the vacuum system.

The base assembly includes a user interface panel for controlling the operation of the vacuum blender. The user interface panel includes a plurality of buttons for controlling the various blending and vacuuming processes and serves as the user input and control communication interface with the blender as will be hereinafter further explained. From the user interface, a user can turn the vacuum blender system on and off, control the speed of the blending operation, and select vacuum and blending when the blending jar and lid assembly are engaged with the vacuum blender unit.

The present vacuum blender unit is also operational with a storage/to-go jar and lid which is likewise engageable with the base assembly as explained above. Unlike the blender jar assembly, the storage jar assembly is not configured for blending and it does not engage the micro switch which activates the blender motor. Instead, a finished blended food item such as a smoothie is merely stored in the storage jar and then placed on the present vacuum blender so that a vacuum can be pulled on the storage jar to better preserve the blended food item stored in the storage jar. In other words, the food item is previously blended before being poured into the storage jar. In addition, the storage jar includes a drinking spout such that when the storage jar is removed from a freezer, refrigerator or other storage location, a user can immediately drink from the storage jar.

Once the storage jar is placed on the base assembly, as previously explained, the vertical tower is moved in a downward direction to lock the storage jar into proper position for performing a vacuum process. When the vertical arm is moved downward, the locking tab engages the spout associated with the storage jar lid, the vacuum port in the vertical arm moves forward in a horizontal plane to engage the vacuum port associated with the storage jar lid, and the second micro switch is engaged so that a vacuum can be pulled through the vacuum motor. If the lid is not present, the blender will not operate to pull a vacuum on the storage jar. The user interface likewise includes a selection button for vacuum only wherein, when pushed, and the storage jar is locked into position with the vertical arm, a vacuum is pulled through the storage jar lid so as to remove oxygen/air from inside the storage jar. As a result, the storage/to-go jar assembly has the ability to store finished blended items such as blended smoothies with the removal of air/oxygen for greater storage preservation. The inclusion of the storage jar having a drinking spout further enhances the use of the storage jar for people on the go.

These and other specific aspects and advantages of the present embodiments will be apparent to those skilled in the art after reviewing the following detailed description of illustrated embodiments set forth below which, taken in conjunction with the accompanying drawings, disclosed an improved vacuum blender unit.

BRIEF DESCRIPTION OF THE DRAWINGS

For a better understanding of the present invention, reference may be made to the accompanying drawings.

Figure 1:
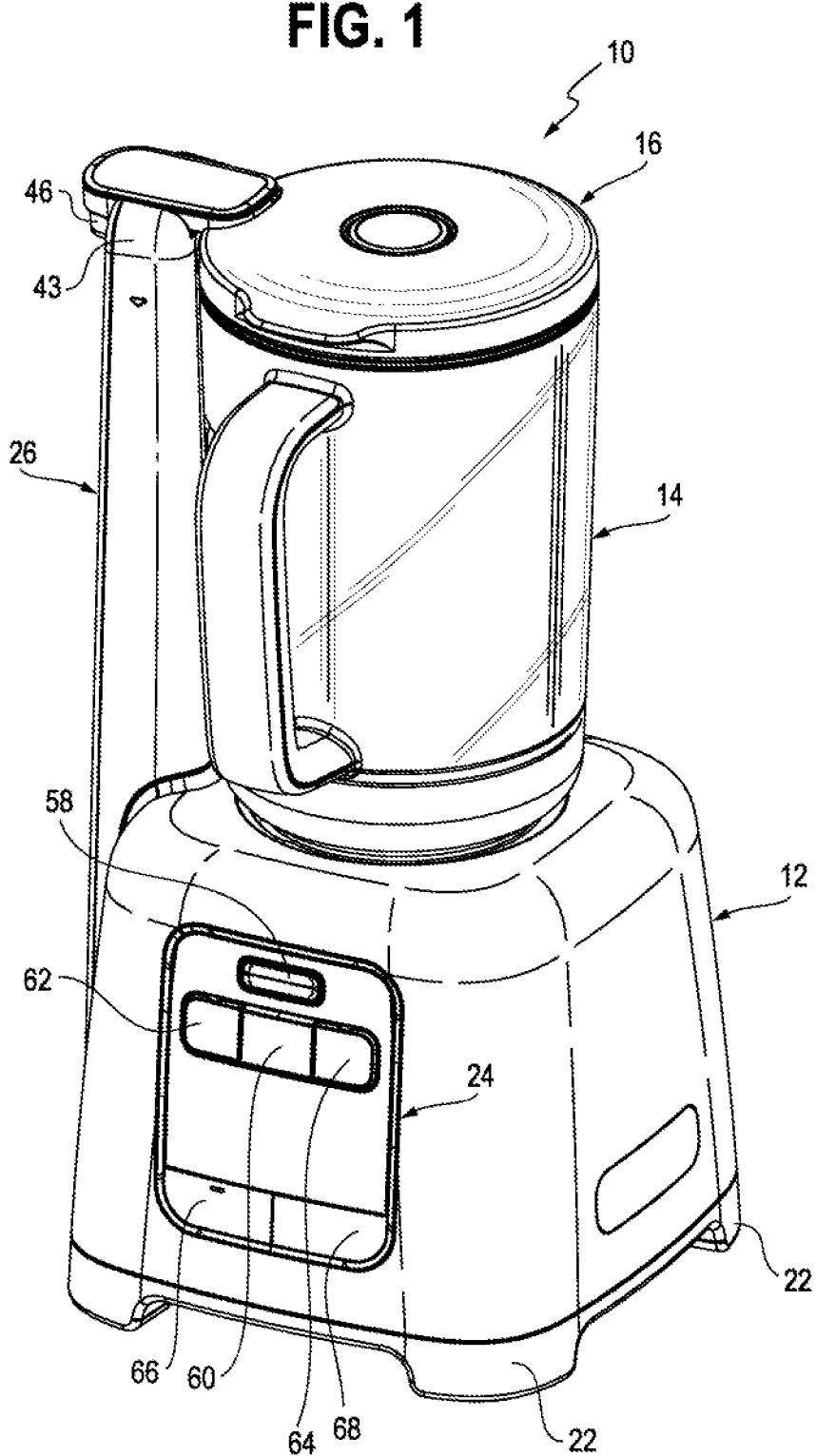
FIG. 1 is a perspective view of one embodiment of a vacuum blender constructed in accordance with the teachings of the present invention.

While the disclosure herein is susceptible to various modifications and alternative forms, specific embodiments thereof are shown by way of example in the drawings and will hereinafter be described in detail. It should be understood, however, that the drawings and detailed description presented herein are not intended to limit the disclosure of the present invention to the particular embodiments disclosed but on the contrary, the intention is to cover all modifications, equivalents, and alternatives falling within the spirit and scope of the present disclosure.

DETAILED DESCRIPTION OF THE INVENTION

Several embodiments of the present invention will now be explained with reference to the accompanying drawings. It will be apparent to those skilled in the art from this disclosure that the following description of the various embodiments of the present invention is provided for illustration purposes only and not for the purposes of limiting the present invention.

Referring to the drawings more particularly by reference numbers wherein like numerals refer to like parts, number 10 in FIGS. 1-7 refers to one embodiment of the present vacuum blender system constructed in accordance with the teachings of one embodiment of the present invention. Blenders typically include a body or base assembly which includes a motor for coupling to an agitator system associated with a blender jar or mixing chamber that couples to the base assembly. More particularly, the overall vacuum blender system 10 includes a base assembly 12, a mixing container or blending jar assembly 14 and a lid member 16. The base assembly 12 houses a blender motor 18 (FIG. 1), electronics, couplings, and is the attachment point between the blender jar assembly 14, an agitator assembly 20 associated with the blender jar 14 and the blender motor 18. In one embodiment, the base assembly 12 includes a plurality of feet 22 for stabilizing the vacuum blender on a supporting surface and includes a user interface 24 for controlling the various modes of operation of the present vacuum blender as will be hereinafter further explained. The blender jar assembly 14 is positioned on top of and engages the base assembly 12 as will be hereinafter further explained and defines the blending chamber in which ingredients are added for blending. The coupling of the blender motor 18 to the agitator assembly 20 associated with the blending jar 14 is accomplished in a conventional manner.

The base assembly 12 further includes a vertical tower arm 26 as best illustrated in FIGS. 1-4, the vertical arm 26 including various components for allowing a vacuum to be pulled from the blender jar 14, these components including vacuum tubing 28, a vacuum plug 30, a wedge member 32, a connecting member 33, a vacuum port 34, and a locking tab 36. The base assembly 12 likewise includes a vacuum motor 38 and associated vacuum tubing 40 which is channeled around the side and back portion of the base assembly so as to mate with the vacuum tubing 28 and vacuum plug 30 associated with the vertical arm 26. This routing of the vacuum tube 40 around the base assembly defines a somewhat tortuous path for connection to the vacuum tubing 28 associated with the vertical tower arm 26 as will be hereinafter further explained.

The base assembly 12 further includes a micro switch 42 located adjacent the base/blending jar locking mechanism for activating the blender motor. This micro switch 42 must be engaged by the blending jar 14 in order to activate the blending motor for a blending operation. In similar fashion, the top portion of the vertical arm 26 likewise includes a second micro switch 44 which must be engaged in order to activate the vacuum motor 38 as will be hereinafter further explained. The upper portion 43 of the vertical arm 26 is movable in a vertical direction for both coupling to and locking the vertical arm 26 to the lid member 16 of the blending jar 14 as will be hereinafter further explained and likewise includes a release button 46 for disengaging the vertical arm 26 from the lid member 16 of jar assembly 14 as again will be hereinafter further explained. The user interface 24 associated with base assembly 12 includes a PC board assembly that controls the workings of the vacuum blender. The operation of the vacuum blender is controlled by various electronic components including but not limited to at least one micro controller, switches, relays, and other electronic circuits. The user interface 24 also serves as the user input and control communication interface with the vacuum blender as will be hereinafter further explained. In this regard, it is recognized and anticipated that the base assembly 12 can take on a wide variety of different shapes and configurations and that other control interfaces can likewise be utilized with the base assembly 12 to control the operation of the vacuum blender unit 10.

Figure 2:
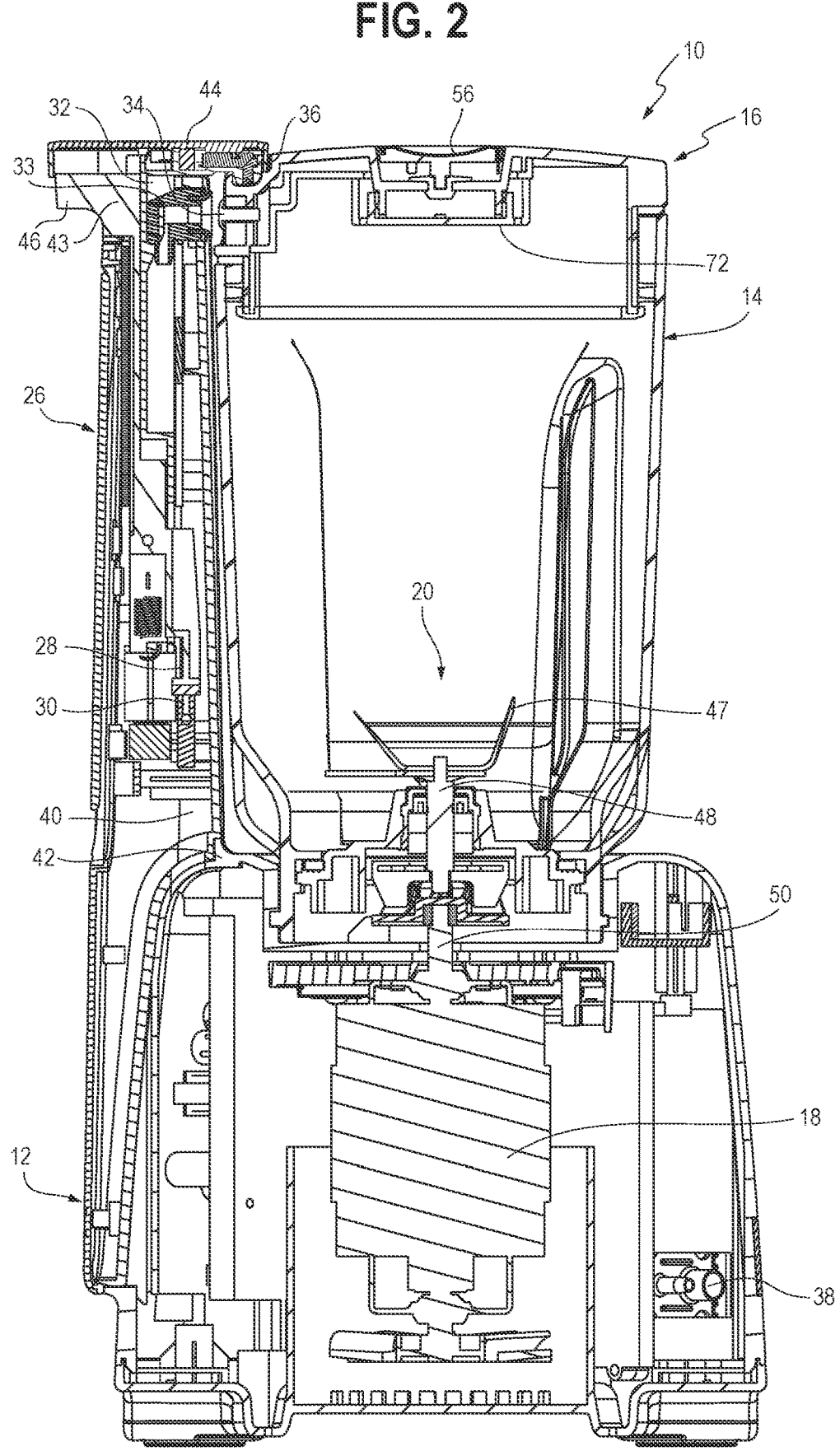
FIG. 2 is an elevational cross-sectional view of the vacuum blender of FIG. 1 showing the blender jar in operative position with the base assembly.
Figure 3:
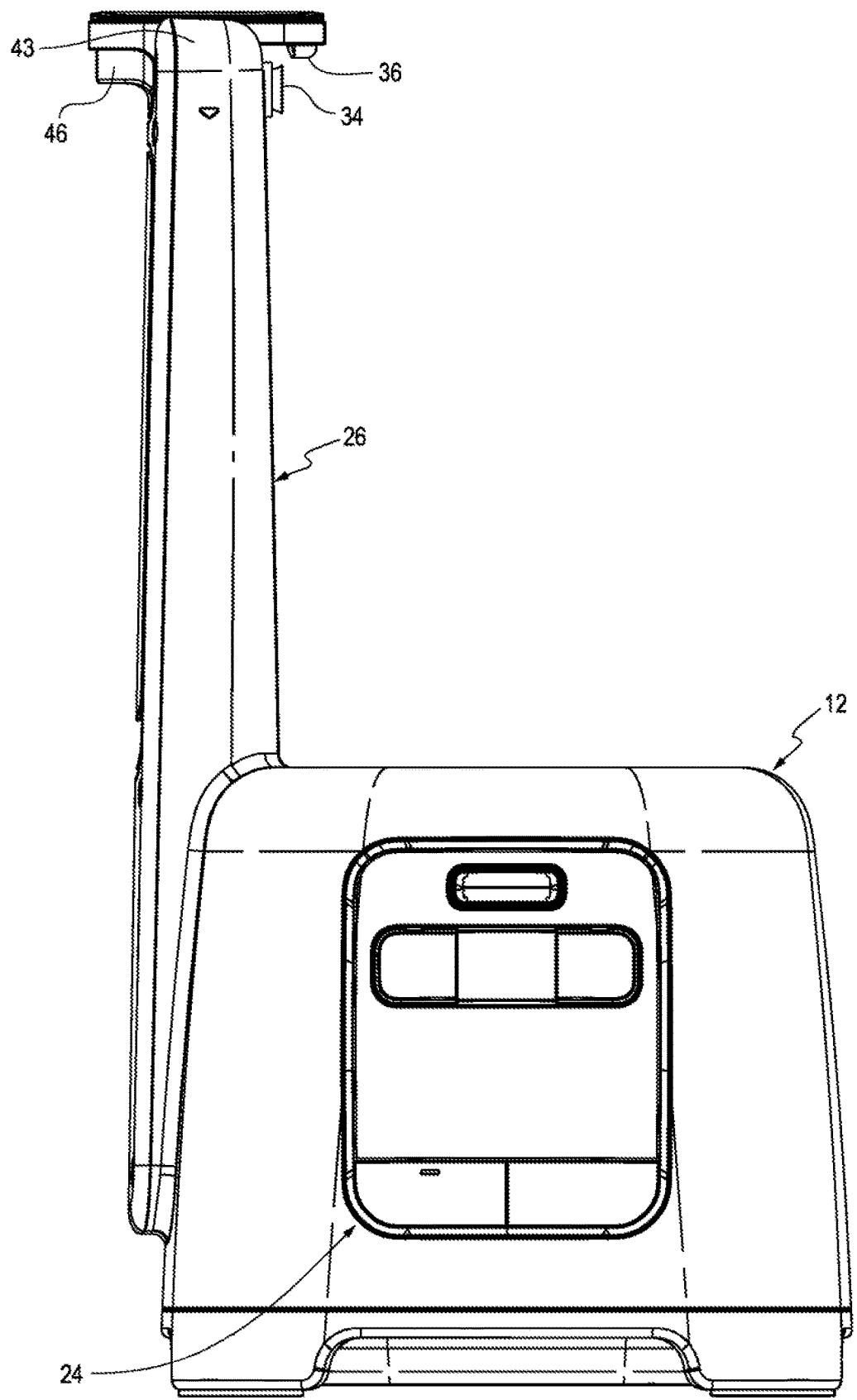
FIG. 3 is a front elevational view of the base assembly of FIGS. 1 and 2.
Figure 4:
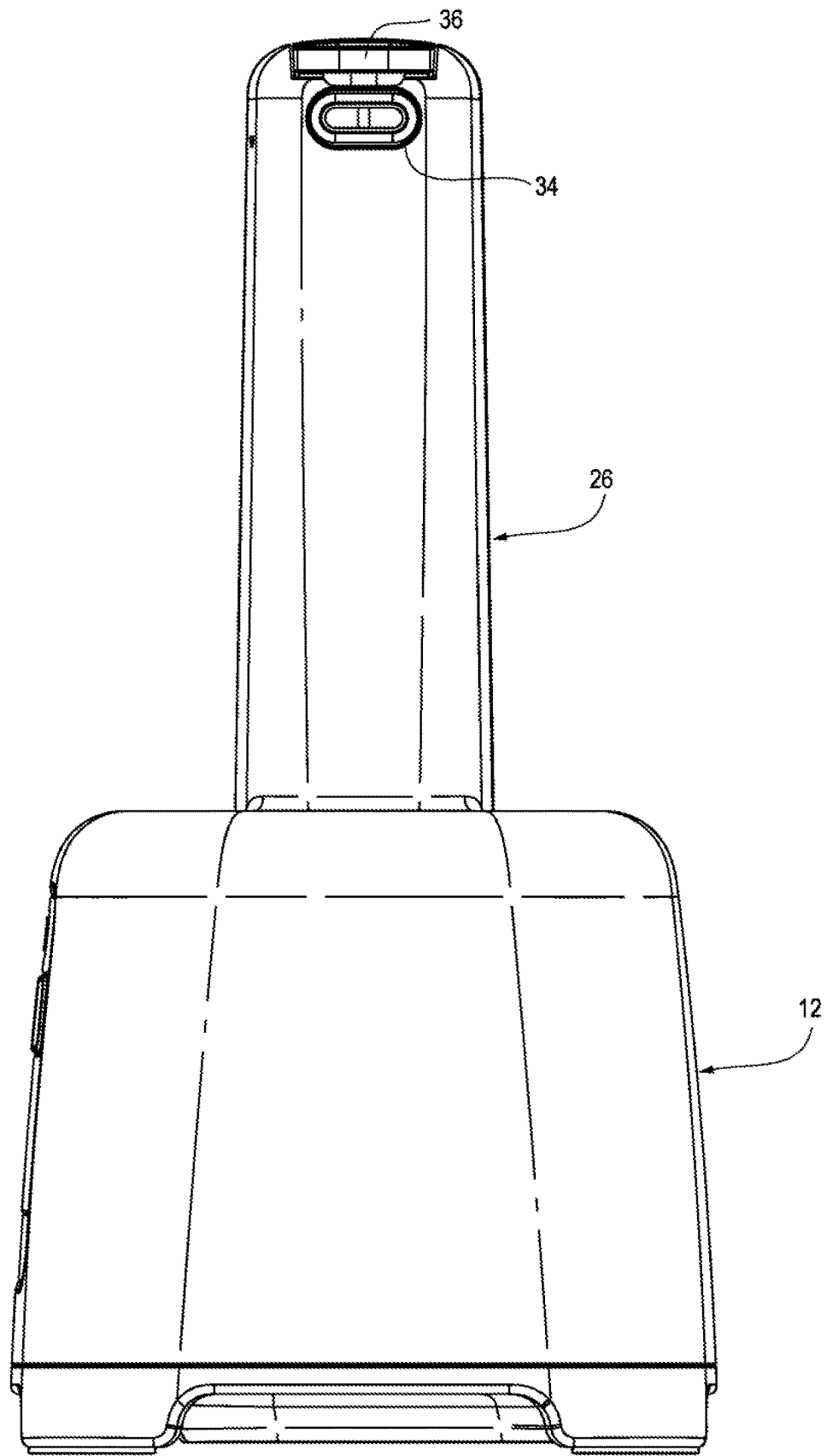
FIG. 4 is a side elevational view of the base assembly of FIG. 3.
Figure 5:
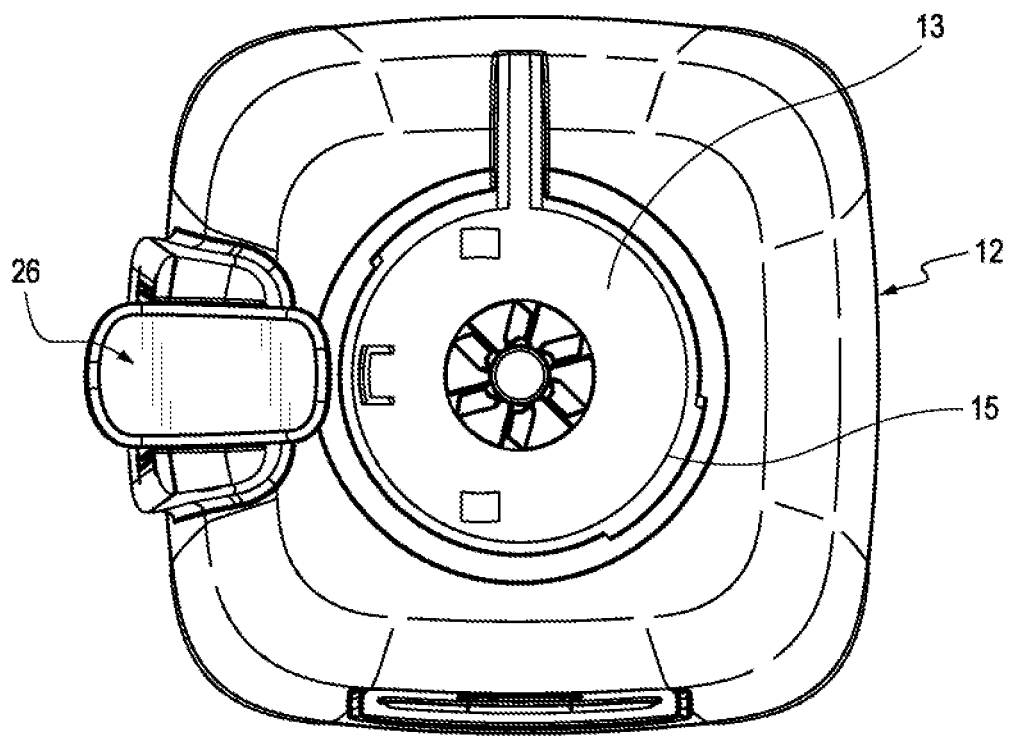
FIG. 5 is a top plan form view of the base assembly of FIGS. 3 and 4.

The agitator assembly 20 associated with the blending jar 14 as best illustrated in FIG. 2 includes one or more bi-directional blades 47 for food chopping, supporting ball bearings, and other components associated with base assembly 12 that couples to the bottom of the blending jar 14. The primary purpose of the agitator assembly 20 is to chop up, grind and agitate the contents of the jar to transform the food contents into a desired output. The agitator blades 47 are located within the bottom of the blender jar 14 and are attached to an agitator shaft 48. The agitator shaft 48 is rotated within a set of one or more agitator ball bearings which maintain the concentricity of the agitator shaft. The agitator shaft 48 connects the agitator blades 47 to the base motor shaft 50 through cooperatively engageable couplings well known in the industry. These couplings allow for removal of the blending jar assembly 14 from the base assembly 12 as well as the agitator shaft from the blender motor housed within the base assembly 12. Attachment and detachment of the blender jar 14 will be hereinafter further explained.

Figure 6:
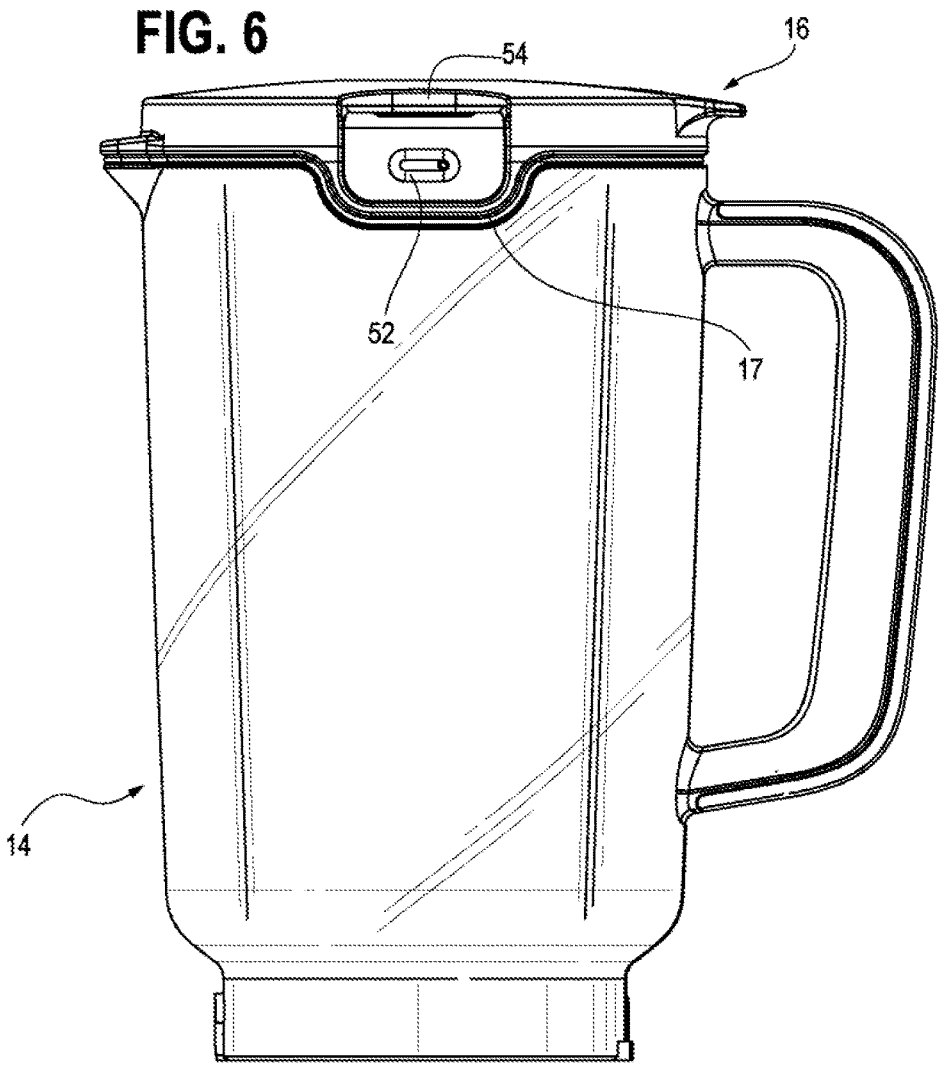
FIG. 6 is a side elevational view of the blender jar assembly of FIGS. 1 and 2.
Figure 7:
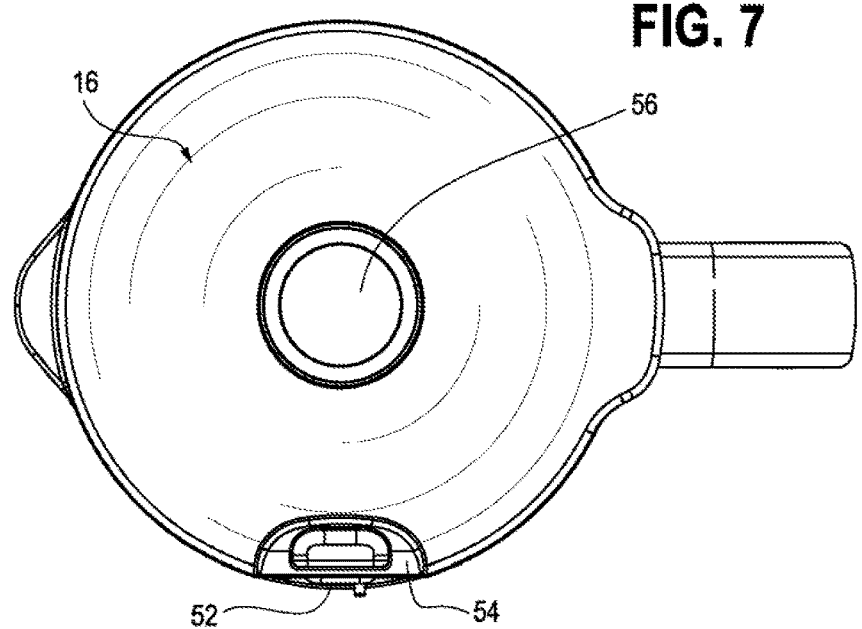
FIG. 7 is a top plan form view of the blender jar assembly of FIG. 6.
Figure 8:
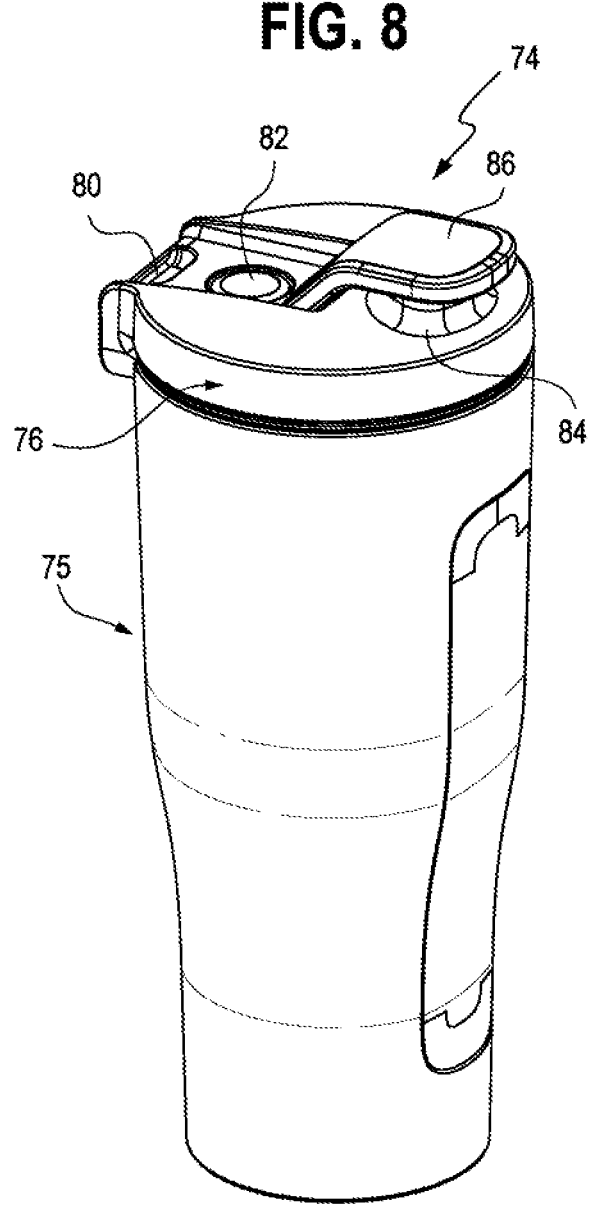
FIG. 8 is a perspective view of another embodiment of a storage jar assembly for use with the present vacuum blender.
Figure 9:
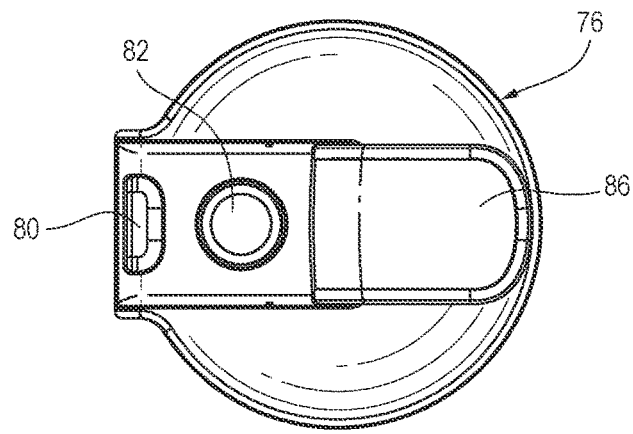
FIG. 9 is a top plan form view of the storage jar of FIG. 8.

As best illustrated in FIGS. 2, 6 and 7, the lid member 16 associated with blending jar 14 includes a vacuum port 52 for mating with the vacuum port 34 associated with the vertical arm 26, a scoop or opening 54 for mating with the locking tab 36 associated with the vertical arm 26, and a vacuum release button 56. The blending jar 14 is shaped and dimensioned to include a cutout or recessed portion 17 which allows the lid member 16 to be engaged with the blender jar 14 in only one position. The vacuum port 52 associated with blending jar lid member 16 likewise includes a valve (not shown) for retaining the vacuum inside the blending jar. This vacuum can be released by depressing the vacuum release button 56. For operational use, the blending jar 14 with the lid member 16 attached thereto is positioned within the cavity 13 associated with the base member for connecting the blending jar 14 to the base member 12. This connection is accomplished by rotating the blending jar 14 through approximately 45° of rotation when placed within the base cavity 13. In this regard, the blending jar can only be positioned within the base cavity 13 in one position as the bottom of the blending jar 14 mates with offset rib members 15 located within the base cavity 13. Once the blending jar is aligned with the offset rib members 15, the blending jar can then be rotated so as to lock the blending jar in a proper operative position on the base assembly. It will be understood that other structures for securing the blending jar 14 to the base member 12 are envisioned, as would be understood by one of skill in the art. When the blending jar is locked in its operative position on base assembly 12, the blending jar 14 engages the micro switch 42 thereby allowing the blender motor 18 to be activated.

Once the blending jar 14 and lid member 16 are engaged with the base assembly 12, the vertical tower arm 26 is now pushed vertically in a downward direction so as to lock the vertical arm 26 to the lid member 16. When the top portion 43 of the vertical arm 26 is pushed downwardly, the locking tab 36 engages the scoop or opening 54 of lid member 16 and locks the vertical arm 26 to the lid member 16. Simultaneously, movement of the upper portion 43 of vertical arm 26 also simultaneously moves the vacuum port 34 associated with the vertical arm 26 forward in a horizontal direction to engage the vacuum port 52 associated with lid member 16. More particularly, as the upper portion 43 of the vertical arm 26 moves in a downward direction, the upper portion 43 may push the wedge member 32 in a downward direction. The wedge member 32 may include a tapered or trapezoidal shape and may be positioned adjacent to the connecting member 33. Therefore, as the wedge member 32 moves in a downward direction, the wedge member 32 preferably pushes the connecting member 33 outward from the vertical arm 26. Moreover, the connecting member 33 may interface with the vacuum port 34. As a result, the connecting member 33 may move outward to push the vacuum port 34 out from the vertical arm 26 as the wedge member 32 moves downward. Thus, the horizontal movement of the vacuum port 34 within the vertical arm 26 is accomplished by movement of the wedge member 32 in a downward direction.

Simultaneously, movement of the upper portion 43 of vertical arm 26 also preferably transitions the vacuum plug 30 into an engaged configuration. More particularly, as the upper portion 43 of the vertical arm 26 moves in a downward direction, the upper portion 43 may move at least a portion of the vacuum plug 30 toward the vacuum tubing 40 associated with the vacuum motor 38. As the vacuum plug 30 moves toward the vacuum tubing 40, the vacuum plug 30 preferably establishes fluid communication between the vacuum tubing 28 and the vacuum tubing 40. Thus, movement of the upper portion 43 in a downward direction preferably enables vacuum operation by placing the vacuum plug 30 into an engaged configuration.

Simultaneously with engaging the locking tab 36 with the lid scoop 54, mating the vacuum port 34 with the vacuum port 52 and placing the vacuum port into an engaged configuration, the second micro switch 44 is also engaged thereby allowing activation of the vacuum motor 58. In this regard, it is to be understood that if the lid member 16 is not positioned on jar assembly 14, or if lid member 16 is not fully engaged with the vertical tower arm 26, second micro switch 44 will not be engaged and this will prevent activation of the vacuum motor 58. As a result, in order to pull a vacuum inside the blending jar 14, second micro switch 44 must be engaged and micro switch 42 must likewise be engaged in order to activate both the vacuum motor and blender motor as will be further explained. It is also recognized that the mating of vacuum port 34 with vacuum port 52 forms an airtight connection that gets stronger when a vacuum is applied to blender jar 14.

Once blender jar assembly 14 and lid member 16 are properly positioned and locked onto base assembly 12 and vertical tower arm 26, a user can both pull a vacuum on blending jar 14 prior to blending any food items positioned within the blending jar. This is accomplished through the use of user interface 24. In this regard, user interface 24 includes a power on/off switch 58, a graphic display screen 60 which can display blending information to the user such as time remaining for blending or a vacuum operation, a vacuum only button 62, a vacuum and blend combination button 64, a stop/play button 66, a pulse button 68, and the center portion 70 of the user interface 24 may include low, medium and high blending speed buttons depending upon the type of food items being blended. It is also recognized and anticipated that other user interface buttons can be utilized on interface 24 to accomplish different blending and vacuum operations. In this regard, when the vacuum only button 62 is activated, it is recognized and anticipated that vacuum may occur for a pre-determined period of time such as, for example, one minute. It is also recognized and anticipated that any low, medium and high blending speed buttons may likewise be set at a pre-selected speed.

Blending jar 14 is utilized to both pull a vacuum and accomplish a blending operation. This is accomplished by pushing the vacuum and blending button 64 on user interface 24 thereby activating vacuum motor 38 causing a vacuum to be pulled through lid member 16. In essence, vacuum port 52 associated with lid member 16 directs the vacuum to the center of the lid member where the vacuum is then directed downwardly into the blending jar 14 through center opening 72 as best illustrated in FIG. 2. Center opening 72 may include a screen or mesh which will minimize debris or food items from being drawn into the vacuum system back down to the vacuum motor. Since the vacuum tubing 40 and 28 form a tortuous path back to the vacuum motor 38, this minimizes the possibility of food or other debris entering the vacuum motor. Once the vacuum has been pulled within blending jar 14, the blending operation will commence and a user can then blend the contents in the blending jar in a vacuum. Once the blending operating has been completed, a user merely pushes the release button 46 on vertical arm 26 thereby allowing the top portion 43 of vertical arm 26 to move upwardly thereby disengaging the arm 26 with the lid member 16. As the vertical arm 26 moves upwardly, the locking tab 36 disengages from the scoop 54, the vacuum port 34 within tower arm 26 moves horizontally away from the vacuum port 52 associated with lid member 16, and the second micro switch 44 is disengaged. In addition, as the vertical arm 26 moves upwardly, at least a portion of the vacuum plug 30 may move in an upward direction away from the vacuum tubing 40. As a result, the vacuum plug 30 may be placed into a disengaged configuration such that the vacuum tubing 28 is preferably fluidly decoupled from vacuum tubing 40. Thus, the vacuum operation is preferably deactivated by the vacuum plug 30 as the vertical arm 26 moves upwardly. Once both the vacuum and blending operations have been completed, the blending jar 14 can again be rotated in the opposite direction to disengage the jar assembly 14 from base assembly 12.

FIGS. 8-11 disclose another embodiment of the present invention wherein a storage/to-go jar 74 can likewise be utilized with base assembly 12. The storage jar 74 includes a storage cup 75 and a lid member 76 which likewise includes a vacuum port 78 (FIG. 10), a scoop or opening 80 for receiving the locking tab 36 associated with vertical arm 26, a vacuum release button 82, a drinking spout 84 and a cover 86 for closing the drinking spout 84 when not in use.

Figure 10:
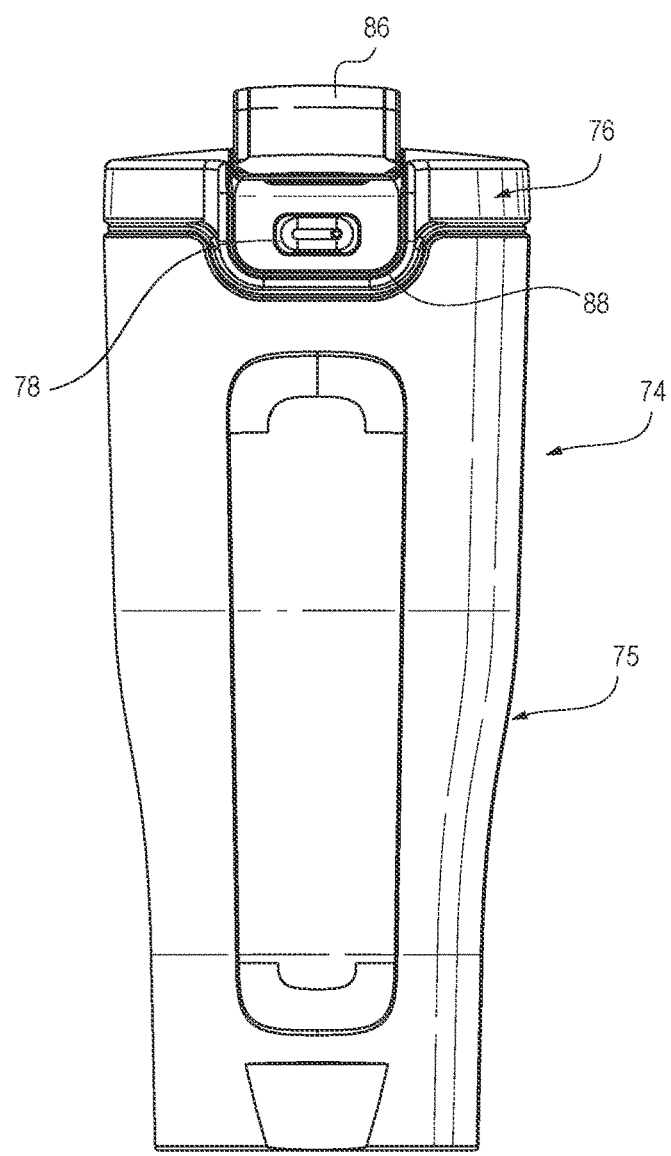
FIG. 10 is a side elevational view of the storage jar of FIGS. 8 and 9.
Figure 11:
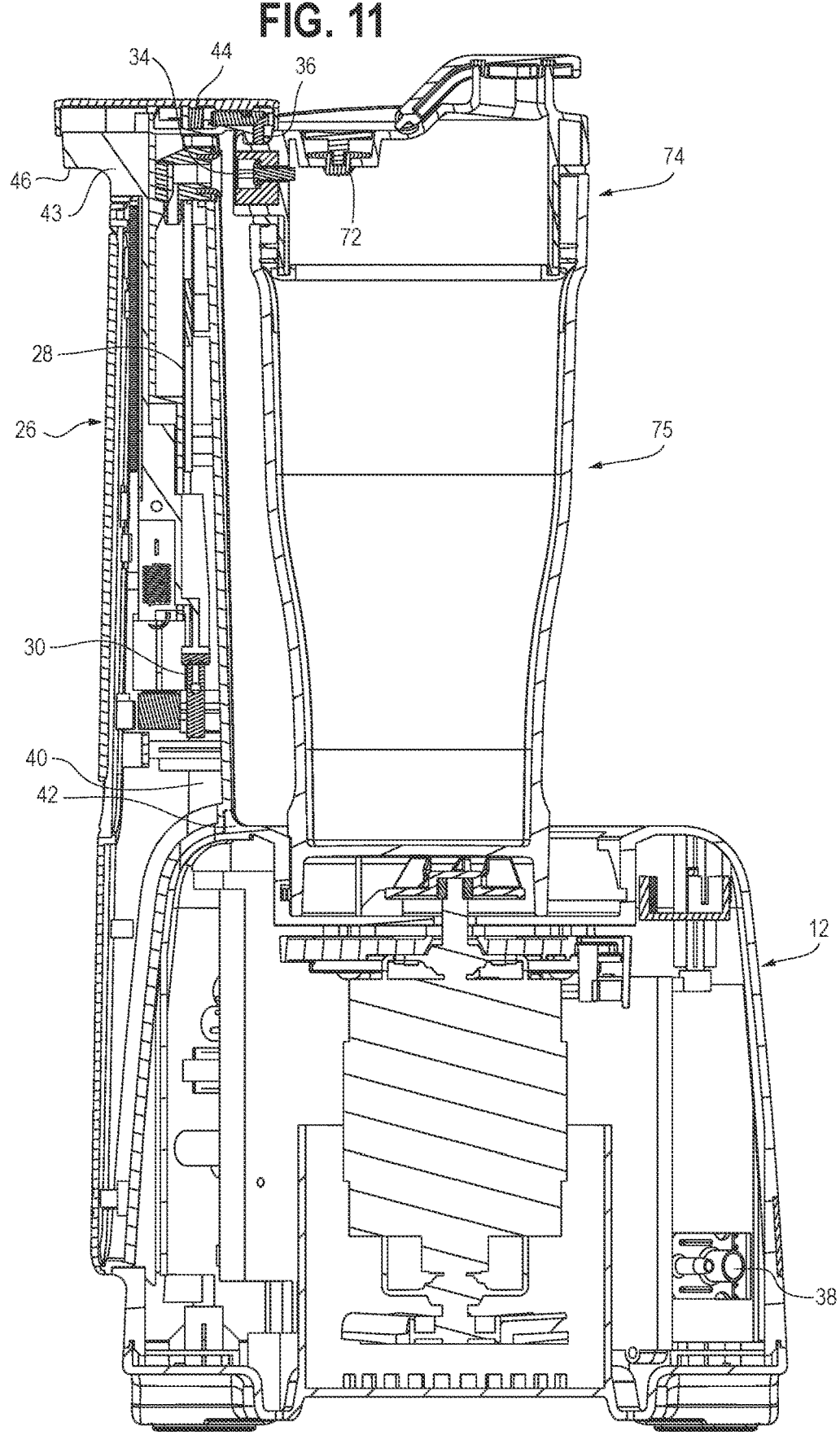
FIG. 11 is an elevational cross-sectional view of the storage jar of FIGS. 8-10 in operative position on the base assembly.

Unlike blending jar 14, storage jar 74 does not include any type of an agitator assembly for blending within the storage cup. Instead, the storage jar is designed to have a finished blended food item such as a blended smoothie to be stored within the storage cup 75 and thereafter using the present base assembly 12 to pull a vacuum on storage jar 74 before the storage jar is placed in a refrigerator, freezer or other storage area. This allows a user to vacuum store a blended food item in the storage jar for future use. Like blending jar 14, storage jar 74 is likewise shaped and dimensioned to include a cutout portion 88 which allows lid member 76 to be engaged with storage cup 75 in only one position. As best seen in FIG. 10, the back portion of lid member 76 that houses vacuum port 78 is sized and shaped so as to fit within the cutout or recessed portion 88 of storage cup 75 thereby allowing the lid member 74 to be engaged with the storage cup in only one operative position. As with blending jar 14, storage jar 74 is likewise dimensioned so as to fit within the base cavity 13 as best illustrated in FIG. 11. In this regard, storage jar 74 is rotated in a manner similar to blending jar 14 to lock the storage jar into position on base assembly 12. Once engaged with the base assembly 12, storage jar 74 does not engage the micro switch 42. Once engaged with the base assembly, the top portion 43 of vertical arm 26 is again pushed in a downward direction such that the locking tab 36 engages scoop 80 of lid member 76 thereby locking vertical arm 26 to lid member 76. This locking engagement likewise moves vacuum port 34 associated with the vertical arm 26 horizontally into mating relationship with vacuum port 78 and it likewise engages the second micro switch 44. Since storage jar 74 does not engage micro switch 42, blender motor 18 cannot be activated when storage jar 74 is engaged with vertical arm 26. Instead, since only the second micro switch 34 is engaged, only a vacuum operation can be achieved since micro switch 44 activates vacuum motor 38. When storage jar 74 is properly engaged with vertical tower arm 26, a user will push the vacuum only button 62 associated with user interface 24 and a vacuum will be pulled on storage cup 75 for a predetermined period of time such as, for example, one minute. Once the vacuum operation is completed, a user will again press the release button 46 to disengage the vertical tower arm 26 from lid member 76 and storage cup 75. Pushing release button 46 reverses the connection operation previously described and allows the storage jar 74 to be removed from base assembly 12. A user can then store the finish blended food item in the storage jar in a refrigerator, freezer or other storage location in a vacuum environment for further food preservation. When a user is ready to drink the contents of storage jar 74, the vacuum release button 82 is depressed so as to release the vacuum from within storage cup 75 and the cover 86 is rotated away from the drinking spout 84 so that a user can easily drink directly from storage cup 75. The cover 86 is rotatably movable between a first position wherein the cover 86 overlaps the drinking spout 84 and covers the same and a second position wherein the cover 86 allows access to the drinking spout 84 for a drinking operation. The vacuum pulled on storage jar 74 stays in storage jar 74 after the jar 74 is removed from base assembly 12 and is only released when the vacuum release button 82 is depressed.

Thus, there has been shown and described a novel vacuum blender unit. As is evident from the foregoing description, certain aspects of the present inventions are not limited by the particular details of the examples illustrated herein, and it is therefore contemplated that other modifications, applications, variations, or equivalents thereof, will occur to those skilled in the art. Any such changes, modifications, variations and other uses and applications of the present constructions will, however, become apparent to those skilled in the art after considering this specification and the accompanying drawings. All such changes, modifications, variations and other uses and applications which do not depart from the spirit and scope of the present invention are deemed to be covered by the present invention which is limited only by the disclosure above.

What is claimed is:

1. A vacuum blender comprising:
a base assembly having a blender motor, a vacuum motor, vacuum tubing associated with the vacuum motor, a blender motor micro switch for activating the blender motor, a cavity for receiving and coupling to a blender jar, and a vertical arm member;
the vertical arm member including a vacuum port, a locking tab, a second micro switch for activating the vacuum motor, and tubing for connecting to the vacuum tubing associated with the base assembly, the top portion of the vertical arm member being movable in a vertical direction to engage and disengage a lid member associated with a blender jar;
a blender jar assembly for coupling to the base assembly cavity including a blender jar and a lid member, the blender jar including an agitator assembly for connection to the blender motor, and the lid member including a vacuum port, and a vacuum release button;
wherein when the blender jar is positioned within the base assembly cavity and rotated through a predetermined number of degrees, the blender jar is engaged and coupled with the base assembly, when so coupled to the base assembly, the blender jar engages the blender motor micro switch;
wherein when the blender jar is engaged with the base assembly and the vertical arm member is moved downwardly, the locking tab engages the lid member, the vacuum port associated with the vertical arm member moves horizontally to engage the vacuum port associated with the lid member in response to the vertical arm member moving downwardly, and the second micro switch is engaged.

2. The vacuum blender of claim 1 wherein the vertical arm member includes a wedge member, wherein when the vertical arm member is moved downwardly, the wedge member moves downwardly causing the vacuum port associated with the vertical arm member to move in a horizontal direction for engagement with the vacuum port associated with the blender jar lid member.

3. The vacuum blender of claim 1 wherein the vertical arm member includes a release button such that when the release button is pushed, the vertical arm member will move vertically upwardly disengaging the locking tab from the lid member, disengaging the vacuum port associated with the vertical arm member from the vacuum port associated with the lid member, and disengaging the second micro switch.

4. The vacuum blender of claim 3 wherein the vertical arm member includes a plug member associated with the vacuum tubing associated with the vertical arm member, wherein at least a portion of the plug member is movable to selectively engage with the vacuum tubing associated with the base assembly when the vertical arm member is engaged with the lid member.

5. The vacuum blender of claim 4 wherein when the release button is pushed, the vertical arm member moves upwardly thereby moving at least a portion of the plug member away from the vacuum tubing associated with the base assembly to disengage the connection with the vacuum motor.

6. The vacuum blender of claim 1 wherein the base assembly includes a user interface for controlling the operation of the vacuum blender.

7. The vacuum blender of claim 1 wherein when the blender jar is engaged with the base assembly and the vertical arm member, a vacuum can be pulled on the blender jar until at least one of a predetermined period of time passes or a predetermined vacuum pressure is reached, and then a blending operation can occur after the vacuum has been pulled on the blender jar.

8. A vacuum blender comprising:
a base assembly having a blender motor, a vacuum motor, vacuum tubing associated with the vacuum motor, a blender motor micro switch for activating the blender motor, a cavity for receiving and coupling to a storage jar, and a vertical arm member;
the vertical arm member including a vacuum port, a locking tab, a second micro switch for activating the vacuum motor, and tubing for connection to the vacuum tubing associated with the base assembly, the top portion of the vertical arm member being movable in a vertical direction to engage and disengage a lid member associated with a storage jar;
a storage jar assembly for coupling to the base assembly cavity including a storage cup and a lid member, the storage cup sized and dimensioned to hold a food item, and the lid member including a vacuum port, and a drinking spout,
wherein when the storage jar assembly is positioned within the base assembly cavity, the storage jar assembly is engaged with and coupled to the base assembly;
wherein when the storage jar assembly is engaged with the base assembly and the vertical arm member is moved downwardly, the locking tab engages the lid member, the vacuum port associated with the vertical arm member moves horizontally to engage the vacuum port associated with the lid member in response to the vertical arm member moving downwardly, and the second micro switch is engaged.

9. The vacuum blender of claim 8 wherein the vertical arm member includes a wedge member, wherein when the vertical arm member is moved downwardly, the wedge member moves downwardly causing the vacuum port associated with the vertical arm member to move in a horizontal direction for engagement with the vacuum port associated with the storage jar assembly lid member.

10. The vacuum blender of claim 8 wherein the vertical arm member includes a release button such that when the release button is pushed, the vertical arm member will move vertically upwardly disengaging the locking tab from the lid member, disengaging the vacuum port associated with the vertical arm member from the vacuum port associated with the lid member, and disengaging the second micro switch.

11. The vacuum blender of claim 10 wherein the vertical arm member includes a plug member associated with the vacuum tubing associated with the vertical arm member, wherein at least a portion of the plug member is movable to selectively engage with the vacuum tubing associated with the base assembly when the vertical arm member is engaged with the lid member.

12. The vacuum blender of claim 11 wherein when the release button is pushed, the vertical arm member moves upwardly thereby moving at least a portion of the plug member away from the vacuum tubing associated with the base assembly to disengage the connection with the vacuum motor.

13. The vacuum blender of claim 8 wherein the base assembly includes a user interface for controlling the operation of the vacuum blender.

14. The vacuum blender of claim 8 wherein when the storage jar assembly is engaged with the base assembly and the vertical arm member, a vacuum can be pulled on the storage jar assembly for a predetermined period of time.

15. The vacuum blender of claim 8 wherein the storage jar assembly lid member further includes a cover member, the cover member being rotatably movable between a first position wherein the cover member overlays the drinking spout and a second position wherein the cover member provides access to the drinking spout for a drinking operation.

\* \* \* \* \*